(12) United States Patent
Logvinov

(10) Patent No.: US 10,284,380 B2
(45) Date of Patent: May 7, 2019

(54) ZERO STANDBY POWER FOR POWERLINE COMMUNICATION DEVICES

(71) Applicant: STMicroelectronics, Inc., Coppell, TX (US)

(72) Inventor: Oleg Logvinov, East Brunswick, NJ (US)

(73) Assignee: STMICROELECTRONICS, INC., Coppell, TX (US)

( * ) Notice: Subject to any disclaimer, the term of this patent is extended or adjusted under 35 U.S.C. 154(b) by 131 days.

(21) Appl. No.: 14/984,997

(22) Filed: Dec. 30, 2015

(65) Prior Publication Data

US 2016/0119153 A1 Apr. 28, 2016

Related U.S. Application Data

(62) Division of application No. 14/559,756, filed on Dec. 3, 2014, now Pat. No. 9,236,909.

(60) Provisional application No. 61/918,366, filed on Dec. 19, 2013.

(51) Int. Cl.
| | | |
|---|---|---|
| *G06F 1/32* | (2019.01) | |
| *H04B 3/54* | (2006.01) | |
| *H04L 12/10* | (2006.01) | |
| *H04L 12/28* | (2006.01) | |

(Continued)

(52) U.S. Cl.
CPC ............ *H04L 12/10* (2013.01); *G06F 1/3209* (2013.01); *G06F 1/3287* (2013.01); *H04B 3/542* (2013.01); *H04L 12/2838* (2013.01); *H04L 2012/2843* (2013.01); *Y02D 10/171* (2018.01)

(58) Field of Classification Search
CPC ....... H04L 12/12; G06F 1/3209; G06F 1/325; G06F 1/3203; Y02B 60/50; Y02B 60/34
See application file for complete search history.

(56) References Cited

U.S. PATENT DOCUMENTS

| 8,295,301 B2 | 10/2012 | Yonge, III et al. |
| 8,750,273 B1 | 6/2014 | Shukla |
| 2006/0128349 A1 | 6/2006 | Yoon |

(Continued)

FOREIGN PATENT DOCUMENTS

| CN | 101897128 A | 11/2010 |
| CN | 102017527 A | 4/2011 |

(Continued)

*Primary Examiner* — Jung H Park
(74) *Attorney, Agent, or Firm* — Slater Matsil, LLP

(57) ABSTRACT

An embodiment is an integrated System on Chip (SoC) including a communication interface configured to implement a communication protocol including functional blocks that are energized or de-energized individually so that a minimum power consumption is used to receive and detect a signal, and a receiver identification (ID) detection function configured to determine whether the signal is intended for the device in which the SoC resides. The SoC further includes a power management function configured to control which functions in the SoC and/or device in which the SoC resides are energized or de-energized depending on the results of the receiver ID detection function, and a power source capable of energizing a minimum number of the functional blocks required to receive and detect a signal, wherein the power source can be used in a low power state and switched over to a main power supply when the SoC is energized.

22 Claims, 4 Drawing Sheets

(51) Int. Cl.
G06F 1/3209 (2019.01)
G06F 1/3287 (2019.01)

(56) References Cited

U.S. PATENT DOCUMENTS

| | | |
|---|---|---|
| 2011/0194471 A1 | 8/2011 | Kim et al. |
| 2012/0057379 A1 | 3/2012 | Aiello |
| 2012/0155349 A1* | 6/2012 | Bajic ............... H04W 4/008 370/311 |
| 2012/0210112 A1 | 8/2012 | Suganami |
| 2013/0024706 A1* | 1/2013 | Katar ............... H04L 12/12 713/321 |
| 2013/0272037 A1 | 10/2013 | Aiello et al. |
| 2014/0192912 A1* | 7/2014 | Chappel ............ H04L 27/2605 375/260 |
| 2015/0156605 A1 | 6/2015 | Skaaksrud et al. |
| 2015/0161884 A1* | 6/2015 | Cregg ............... G08C 17/02 340/5.61 |

FOREIGN PATENT DOCUMENTS

| | | |
|---|---|---|
| CN | 103138949 A | 6/2013 |
| WO | 2010106113 A2 | 9/2010 |

* cited by examiner

ZERO STANDBY POWER FOR POWERLINE COMMUNICATION DEVICES

PRIORITY CLAIM AND CROSS-REFERENCE

This application is a Divisional of U.S. patent application Ser. No. 14/559,756, filed Dec. 3, 2014, (now U.S. Pat. No. 9,236,909 issued Jan. 12, 2016) and titled "Zero Standby Power for Powerline Communication Devices," which claims the benefit of the following provisionally filed U.S. Patent Application: Application Ser. No. 61/918,366, filed Dec. 19, 2013, and titled "Zero Standby Power for Powerline Communication Devices," which applications are hereby incorporated by reference.

TECHNICAL FIELD

The present disclosure relates generally to the device architecture for devices that communicate over local area communications networks and, more specifically, to a powerline communications (PLC) network interface.

BACKGROUND

It is well known in the art that it is important to reduce the energy consumed by electrically powered devices, especially while they are not being used (e.g., in "standby", "idle", and/or "fast-wake" modes). In this mode, the electrically powered device is inactive as regards normal operation (e.g., display of images for a television set, sound reproduction for hi-fi equipment, etc.). As is generally known, an electrically powered device in standby mode is in any case supplied power through a main power-supply, such as domestic power, and consumes energy. Considerable efforts have been made in the last few years to limit current consumption in standby mode of electrically powered devices. However, it is evident that, if the consumption in standby mode of a plurality of electrically powered devices generally present in dwellings is considered, non-negligible daily consumption levels may be reached.

SUMMARY OF THE INVENTION

An embodiment is an integrated System on Chip (SoC) including a communication interface configured to implement a communication protocol including functional blocks that are energized or de-energized individually so that a minimum power consumption is used to receive and detect a signal, and a receiver identification (ID) detection function configured to determine whether the signal is intended for the device in which the SoC resides. The SoC further includes a power management function configured to control which functions in the SoC and/or device in which the SoC resides are energized or de-energized depending on the results of the receiver ID detection function, and a power source capable of energizing a minimum number of the functional blocks required to receive and detect a signal, wherein the power source can be used in a low power state and switched over to a main power supply when the SoC is energized.

Another embodiment is a method including receiving a first message from a network at a first network node, detecting a destination address for the first message, determining which functional blocks in the first network node to energize based on the detected destination address of the message, and energizing the determined functional blocks.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, that the present disclosure provides many applicable inventive concepts that may be embodied in a wide variety of specific contexts. The specific embodiments discussed are merely illustrative of specific ways to make and use the invention, and do not limit the scope of the invention.

The present disclosure will be described with respect to embodiments in a specific context, namely a method and apparatus for improving the standby power consumption of network connected systems. Embodiments of this invention may also be applied to other circuits and systems, such as, but not limited to, wireless systems such as wireless communication systems.

Some attempts at reducing the energy consumed by electrically powered devices in a standby mode are to use a remote control as a stimulus to trigger a mechanism that powers on the system. Some examples of these types of systems are U.S. patent application Ser. No. 13/256,913; U.S. patent application Ser. No. 13/832,687; and U.S. patent application Ser. No. 13/832,583, which are all hereby incorporated by reference. In general, these devices use a remote control to signal (e.g. electromotive energy (RF or light) or audio) when the power status of the device should change.

Some devices contain various elements and or functions that can be turned off or idled when they are not needed. Such functions are normally controlled by a power management function within the device that understands when functions such as memory, peripherals, process accelerators (such as graphic, crypto, or math co-processors), and other elements may be shut down or idled. The power management function may also receive a signal from the network, commonly referred to as a Wake on LAN (WoL) signal or "wake up event" to indicate potential message traffic requires the system to wake up. However, for the devices in this category, the power management function itself requires the entire device to be powered (e.g., with the power supply) which consumes a great deal of power.

Generally, embodiments of the present disclosure are a communications receiver consisting of functional blocks that can be energized by multiple energy source(s). The communications receiver monitors the communications signals for an appropriate wake up event. The minimum functions needed for the receiver detector function is constantly powered by a power source (e.g. a battery) until the wake up event is detected, after which other power sources (e.g. power supplies) may be used to energize the system. In addition, some functional blocks can be capable of higher initialization and processing speeds than normally used in order to more quickly respond to the wake up event.

Figure 1:
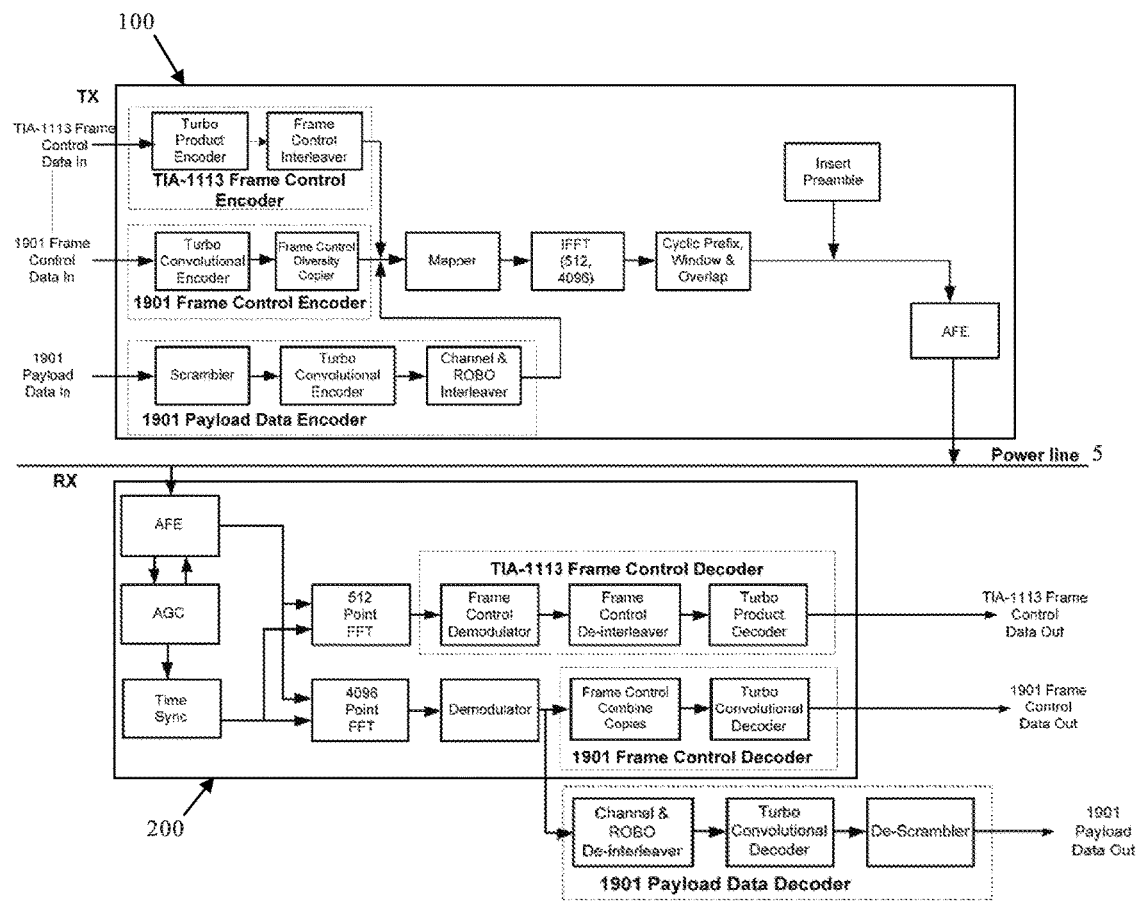
FIG. 1 is a block diagram of powerline communication (PLC) transceiver architecture.

In accordance with an embodiment, an integrated communication system on chip (SoC), such as but not limited to the powerline communications (PLC) architecture shown in FIG. 1, contains functions (and parts of functions) that can be powered or unpowered as needed. More specifically, the functions may be powered from different sources external or internal to the SoC. In addition, the information about whether or not the system should wake up is communicated through the SoC's communications interface and not a secondary remote control interface, which would require additional circuitry and power. This approach allows the system unique opportunities to save power over prior art.

In some embodiments, the SoC contains communications interface, which is PLC. The PLC signal from the PLC network is coupled to the PLC receiver functions. Only the receiver functions necessary to receive and detect the PLC signal are powered. The system or device of which the SoC is a part may remain turned off or in low-power standby. The energy to power the minimum necessary receive functions comes from a small rechargeable battery ("battery") or energy scavenged from the network, which allows the entire main power supply to be de-energized for further saving energy. The receiver decodes a very simple message frame control header, which contains a network destination address. If the destination address is the SoC's node address, the device can send a signal to power up the device or parts of the device as necessary, including replacing the battery power source with a different power source.

In some embodiments, the battery is monitored by a battery charging circuit and when necessary, only the battery charging circuit is activated, using energy from the alternating current (AC) lines, to recharge the battery.

In some embodiments, the SoC recognizes that some communications protocols require a response to the PLC network signal. However, the SoC and device functions often take time to wake up and respond to the stimulus. This delay may be long relative to the communications protocol's expectations. A response message is a very simple message that the SoC communicates to the source of the message to fulfill the protocol and system expectations. The simple response message may be, but is not limited to, pre-generated and stored in memory during a period when the device power was energized and the network was established, such as at an initial startup time. When the SoC sends the response message, it does so by sending the pre-generated stored data from memory into a digital to analog signal generator capable of directly generating the analog form of the signal and coupling it through passive AC coupling components to the AC mains. Hence, the formal transmit path does not have to be activated. In an embodiment, the simple response message is a HOLD message as it causes a specific delay before the next message is sent. In another embodiment, a negative acknowledgement (NACK) response may be the simple response message as it is a message type that causes the original message to be sent again at the transmitter's earliest convenience. It is also recognized that the response can be addressed to a broadcast, multicast, or other prearranged network address.

In some embodiments, a beacon, a preamble message, or some other signal element is sent rather than a response message.

In some embodiments, functional blocks that follow the constantly powered functional blocks are fast to turn on and can process the signal at a higher rate than normal in order to be able to respond to the communication protocol's expectations. These functional blocks may not normally operate at the higher rate due to higher rates of power consumption in this state.

In some embodiments, the receiver samples and digitally stores the wake up signal. When the system fully wakes up or boots, it processes and decodes the stored message in order to respond. In this embodiment, the signal payload does not have to be decoded in a low power mode.

In some embodiments, where the message's destination address is not the SoC's network address, but is, although not limited to, a broadcast or multicast address, the receiver can change the type or depth of wake up for the SoC and the device. For example, some message types may be indicative of the need to energize the entire system using the main power supply and others may be indicative of energizing just the entire receiver and may use a smaller or more efficient power source.

In some embodiments, simpler methods of signaling the PLC interface could be used such as a simple sequence of symbol phases such as generated in IEEE Std. 1901.2012TM Inter-symbol Protocol (U.S. Pat. No. 8,295,301) and incorporated herein by reference.

In some embodiments, the SoC contains the processing power, memory, analog front end, coprocessor, and other functions (not shown) necessary to provide for a core function. This core function may be a communications function or may include a communications function and may be a device which incorporates the SoC. FIG. 1 shows an architecture of an orthogonal frequency division multiplexing (OFDM) system that is consistent with those specified by IEEE 1901-2010TM, HomePlug AV, HomePlug Green PHY, and other standards. These elements are also typical of those used in various embodiments of the present disclosure and are generalized in FIG. 2.

Figure 2:
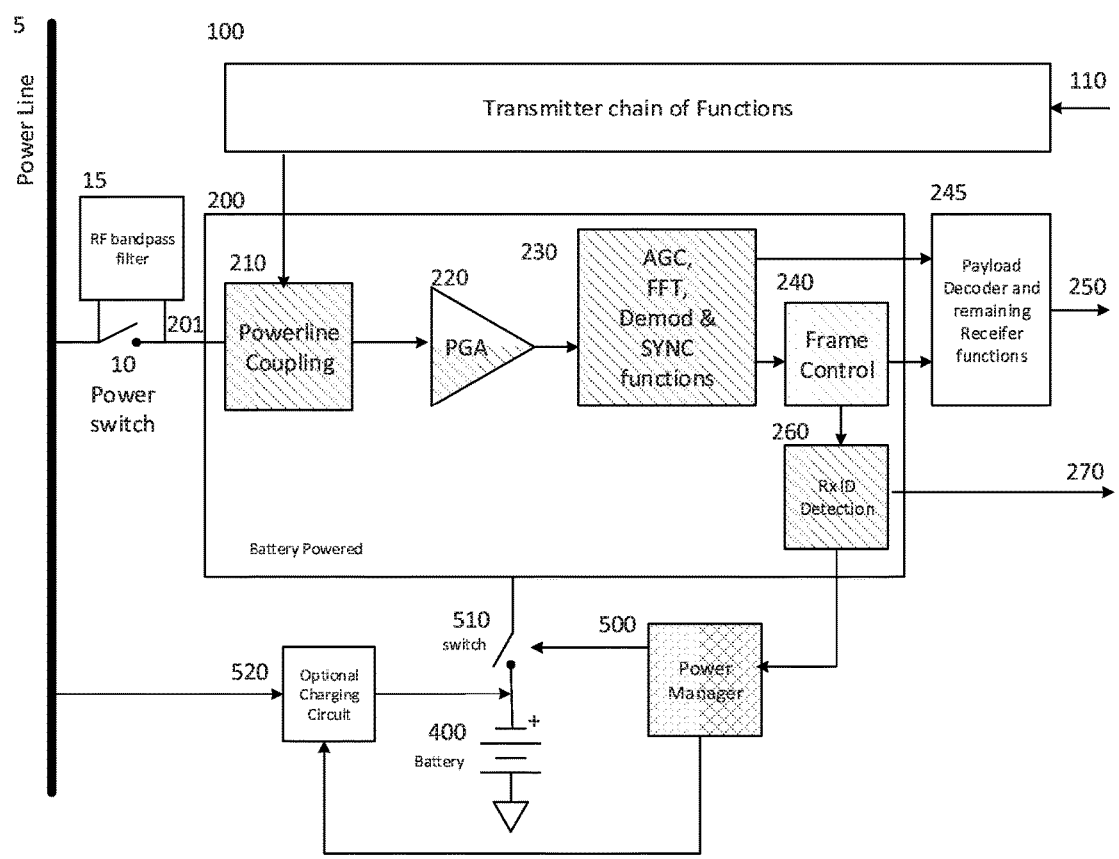
FIG. 2 is a block diagram of a PLC System on Chip (SoC) according to an embodiment.
Figure 4:
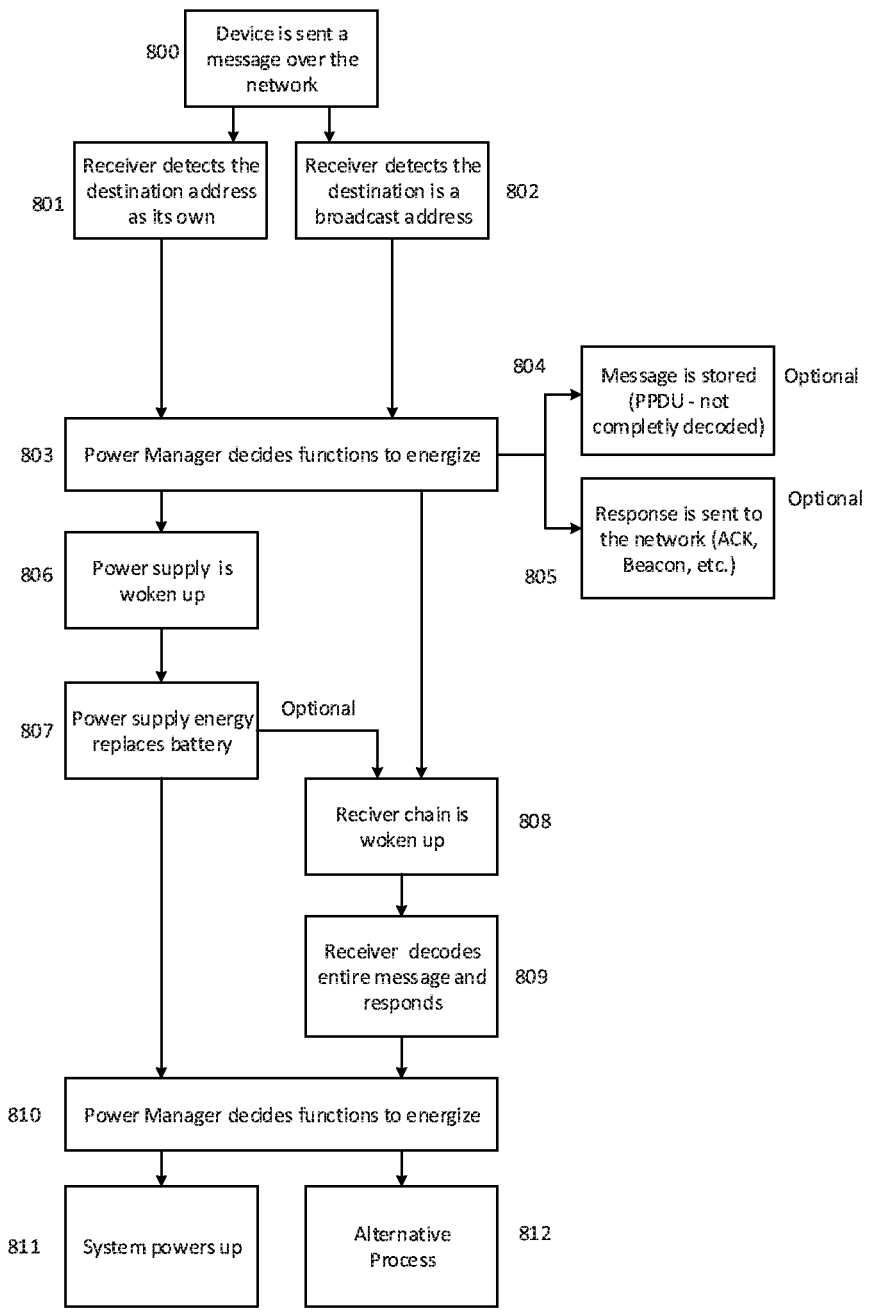
FIG. 4 is a process flow diagram of an example process of operating a PLC SoC according to an embodiment.

FIG. 2 is a block diagram of a PLC System on Chip (SoC) according to an embodiment. FIG. 2 (supported by FIG. 4) shows a communications interface 201 that is usually connected to the powerline 5. The communications interface 201 passes the communications signal and blocks the high voltage levels from the powerline 5. The communications interface 201 also conditions the circuit to match the impedance of the powerline 5 and the interface 201 in order to maximize signal transfer. The communications interface 201 may also filter noise. The interface 201 may also be connected to the powerline 5 through a power switch 10. In this case, a radio frequency (RF) bypass filter 15 can be used to help the high frequency PLC signal to pass around the power switch in its off state. Both the transmitter chain of functions 100 and the receiver chain of functions 200 use the powerline coupling circuit 210 and communications interface 201.

Some PLC signals do not require as complex of processing as others do and may be detected by a minimum portion of the normal OFDM PLC receiver function chain. Only the portion of the receiver chain 200 necessary to detect the signal is powered by a battery 400 which allows the minimum receiver functions 200 to detect the PLC signal that is used as a wake up event. The rest of the transceiver, the SoC, and even the device in which it is used may remain in low power mode ("sleep," "idle," "fast-wake" modes among the common names and states).

When this device is initially installed and set up, it is also connected to the network. At that time a network provisioning is done including setting up the security features (which messages may be sent in the clear without power-hungry encryption functions), and logged onto the network. Once the device joins the network, it is referred to as a node on that network and is given a node address. Messages sent to the device contain the node's address as a destination address. Messages sent by the node uses its address in the source address. Devices may also send messages to multiple devices using a unicast or multicast message address.

When the receiver node in FIG. 2 receives a signal on the PLC network 5 (step 800), it detects and decodes it (steps 801 and 802) using the minimum functions (e.g. powerline coupling circuit 210, programmable-gain amplifier function 220, AGC, FFT, Demod & Sync Functions 230, and Frame control function 240). The frame control function 240 decodes the destination address in a frame control field. Frame control fields are a part of message packets that instruct the receiver what to do with the frame, and include the destination and source addresses, although each protocol may vary on how it is implemented and remain within the scope of this disclosure. The frame control function 240 is a generic function so when it decodes a destination address that is intended for this node, it signals the Receiver ID Detection (Rx ID Detection) 260 function that has been designed to respond by notifying (step 803) the power manager function 500 and to notify the upper layers and other SoC functions by connection 270 that the event has happened. This can be, for example, a connection to a latching interrupt port so that when the system wakes, the device can detect the origination of the wake request.

When the power manager function 500 is notified, it responds in several ways and its responses may differ as needed in different implementations. For example, the number of wake signals may vary, which sequence the functional blocks to be powered up or a delay may be added. Additional options are discussed below. The primary function of the power manager 500 is to turn on the appropriate functional blocks (e.g. in receiver chain 200) from the proper energy sources. In the preferred embodiment, the power manager function 500 uses switch 510 to switch (step 807) from the battery 400 power to a power supply source (not shown) in order to power the minimum functions of the receiver chain 200. The power supply may be a main power supply, an external power supply, an internal power supply, or some other energy source that is energy efficient (low power). The power manager 500 also determines which other functions to turn on in order to best minimize energy consumption but at the same time, fulfill the system requirements. For example, the power manager 500 may decide to power up the entire system (step 811), or the power manager may decide on an alternative process (step 812) such as powering up specific parts of the SoC or the system.

For example, if the Rx ID Detection 260 is notified that the destination address is the device node's address, this means that something is trying to contact the device, and thus, the power manager 500 may energize the entire system. In this case, the entire receiver may be powered up (step 810) to receive the message and decide which of the remaining SoC or device functions need to be energized. If the destination address is a multicast or broadcast address, which may have been set up during the network provisioning process, it may be inferred that the network is requesting a system-wide wake up. In the case of a system-wide wake up, the system may have a wake up period or specific time to wake up because typically not all nodes will be able to wake at the same time.

Figure 3:
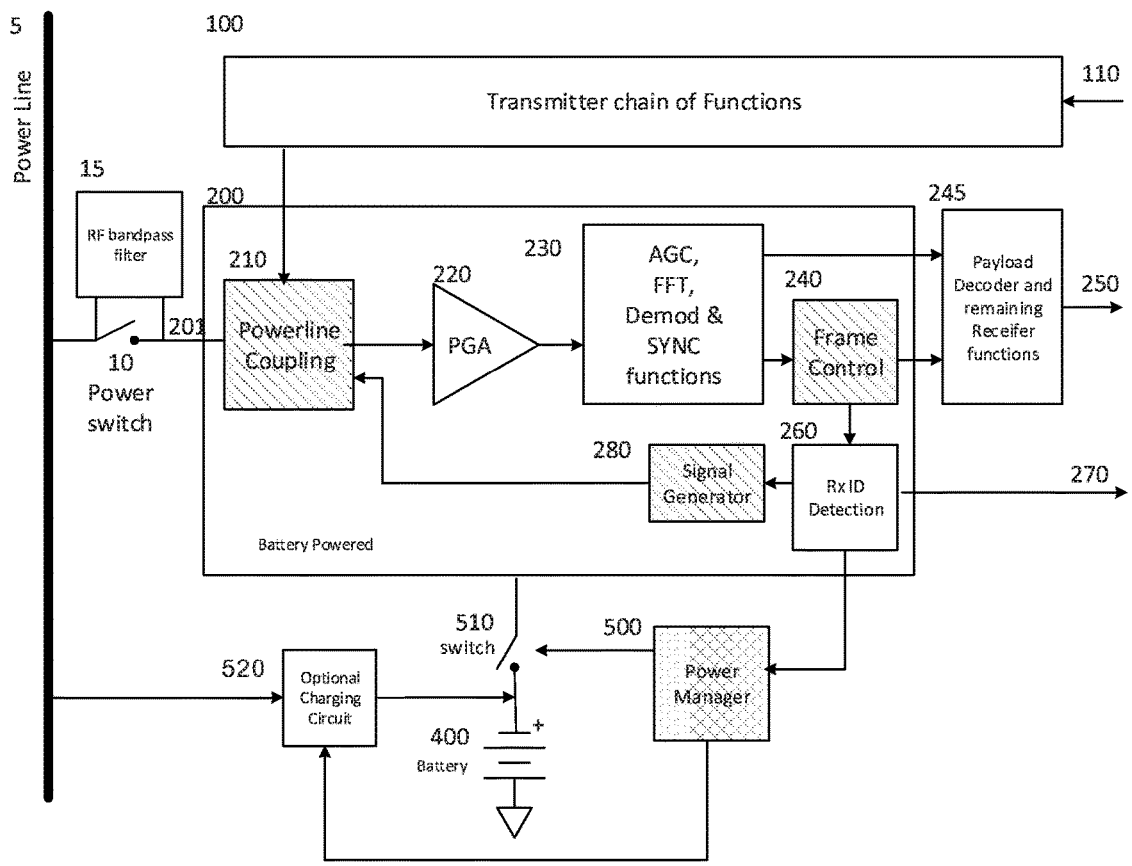
FIG. 3 is a block diagram of a PLC SoC including a signal generator according to an embodiment.

Another function of the power manager 500 is to charge the battery 400 in order to keep it sufficiently charged. As illustrated in FIG. 3, a battery charging circuit 520, when necessary, may be activated, using energy from the power lines 5, to recharge the battery. This lengthens the battery life and may use a very simple, low cost, lower energy internal or external charger than the main power supply. The power manager 500 is also responsible for the reverse process of when the system goes from energized back to a low power state, which may be initiated, for example, by another message, timeout, completion of a process, and/or command from the connection 270.

In some embodiments, the SoC recognizes that some communications protocols require a response to the PLC network signal to fulfill the protocol's expectations. Without a response, some protocols can assume the device is no longer connected and disassociate (remove) it from the network. In addition, some events are very important by their nature and require quick response, which may depend on the system in which the system is used. For example, a medical device application may have more critical response time demands than an entertainment system. However, the SoC and device functions often take time to wake up and respond to the stimulus. This delay may be long relative to the communications protocol's expectations. In FIG. 2, a response message would normally be communicated (step 805) to the network via the transmitter chain of functions 100. One means to send a message is to energize the transmit chain and processor functions in order to send a message. An objective of this disclosure, however, is to avoid energizing functional blocks that are not necessary for the wake up function.

FIG. 3 is a block diagram of a PLC SoC including a signal generator according to an embodiment. In PLC systems, the signal that is transmitted through the powerline coupler is an analog signal comprised of hundreds of separate carrier frequencies modulated with the intended data. It is designed to handle a wide range of data and channel conditions. In the embodiment utilizing a simple response message (e.g., the information content is known ahead of time), the simple response message can be pre-generated when the network is initially setup and connected, sampled and stored in memory in digital form. In some embodiments, the receiver chain 200 includes a signal generator 280 coupled between the powerline coupling circuit 210 and the Rx ID detection function 260. In these embodiments, when the system needs to send the response message (step 805), the digital signal may be sent through the signal generator 280, such as a digital to analog converter, which generates the transmitted analog signal directly from the digital data. The message may be simple in the modulation type used (such as binary phase shift keying (BPSK) or as specified by the protocol) and in content, such as a NACK or HOLD message as specified by IEEE Std 1901-2010TM and included herein by reference. To send a NACK or HOLD message, the message control frame type is set to a "Start of Frame" type. The Selective Acknowledgement field can be used to communicate an ACK, NACK, HOLD, or FAIL status in response to a previous message. The NACK indicates to the source of the previous message that it was not understood by the intended receiver and the message is retransmitted. If the system is not fully awake to receive the subsequent attempt by the source, another NACK may be transmitted. In a preferred embodiment, a HOLD response is sent. The HOLD message instructs the previous message's transmitter to wait one Beacon period before resending the message. This provides additional time for the receiver to wake. These messages may also be sent using broadcast and multicast addresses. This is useful if other devices in the network need to know that the receiving device is not ready to receive data yet, and may also resolve an issue if the transmitting station address is not known or has been corrupted.

There are other types of signals that are within the scope of this disclosure. For example, in another preferred embodiment, a beacon, a preamble message, or some other signal element is detected as the wake up signal, or sent as a response, rather than using a response message.

In some embodiments, the functional blocks of the receiver 245 that follow the constantly powered functional blocks 200 are able to wake up and or process the signal at a higher rate than normal in order to be able to respond in time to the communication protocol's expectations. These functional blocks 245 would not normally operate at the higher rate because they would also exhibit higher rates of power consumption in this state, however, the power consumption just for a fast response message would not be significant.

In some embodiments, the receiver chain 200 detects the signal wake signal only to detect the destination address. If the signal (message) is intended for the node, the signal can be analog to digitally sampled and stored (step 804) in memory (not shown). If the signal were a message, the payload, for example, would not have to be decoded in low power mode and could be stored for later decoding. Later, when the system is energized, the system can process the signal samples and decode the message so that a more complete response may be determined.

In some embodiments, where the message's destination address is not the SoC's network address, but is, although not limited to, a broadcast, multicast or a predetermined destination address (that can be used as a universal wake up address), the receiver chain 200 can change the type or depth of wake up for the SoC and the device. For example, if the message was addressed to the node's address, it might be appropriate to wake then entire system (step 811). If the message used a broadcast address, it might be appropriate to wake just the transceiver chain (e.g. transmitter chain 100) to determine what the next appropriate wake up level would be (step 812).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving a first message from a network at a first network node;
   partially decoding the first message, the partially decoding step decoding a destination address for the first message;
   determining which functional blocks in the first network node to energize based on the destination address of the first message, the functional blocks of the first network node comprising a receiver, a transmitter, and a payload decoder, the determining comprising:
      if the destination address is the first network node's destination address, the determined functional blocks comprises all of the functional blocks in the first network node; and
      if the destination address is not the first network node's destination address, the determined functional blocks comprises less than all of the functional blocks in the first network node; and
   energizing the determined functional blocks.

2. The method of claim 1 further comprising:
   responding to the first message using the energized functional blocks.

3. The method of claim 2, wherein the responding to the first message using the energized functional blocks further comprises transmitting a pre-stored message over the network.

4. The method of claim 3, wherein the pre-stored message is a negative acknowledgement (NACK).

5. The method of claim 3, wherein the pre-stored message is a protocol beacon.

6. The method of claim 3, wherein the pre-stored message is a preamble symbol.

7. The method of claim 1 further comprising:
   storing the full received first message in a memory when the first network node is in a low-power operation; and
   when the first network node is restored to a normal-power operation, decoding the full stored first message.

8. The method of claim 1, wherein the received first message is a powerline communication (PLC) message.

9. The method of claim 1 further comprising:
   monitoring a first power source; and
   charging the first power source when necessary.

10. The method of claim 1, wherein the energizing the determined functional blocks further comprises energizing a main power supply, the main power supply capable of energizing all of the functional blocks of the first network node.

11. The method of claim 1, wherein the energizing the determined functional blocks further comprises energizing only receiver functional blocks.

12. The method of claim 11 further comprising:
   decoding the full received first message using the energized receiver functional blocks; and
   transmitting a response message over the network.

13. A method comprising:
   receiving a first message from a network at a first network node, the first network node being a system on chip device, the first network node comprising two power sources, a first power source being a battery and a second power source being a main power supply, the main power supply capable of charging the battery, the first network node comprising a first receiver section and a second receiver section, the first receiver section being constantly powered by either the battery or the main power supply, the second section of the receiver comprising a payload decoder;
   detecting, using the first receiver section, a destination address for the first message;
   notifying a power manager in the first network node of the detected destination address;
   determining, by the power manager, which functional blocks in the first network node to energize based on the detected destination address of the first message, the functional blocks of the first network node being configured to be energized or de-energized individually, wherein if the detected destination address is the first network node's destination address, the determined functional blocks comprises the second section of the receiver and a transmitter, wherein if the detected destination address is not the first network node's destination address, the determined functional blocks does not comprise the second section of the receiver;
   energizing the determined functional blocks, the determined functional blocks capable of being energized with either the first power source or the second power source depending on a power mode of the first network node; and responding to the first message using the energized functional blocks.

14. The method of claim 13, wherein the responding to the first message using the energized functional blocks further comprises transmitting a pre-stored message over the network.

15. The method of claim 14, wherein the pre-stored message is a negative acknowledgement (NACK), a protocol beacon, or a preamble symbol.

16. The method of claim 13 further comprising storing the received first message in a memory when the first network node is in a low-power operation; and when the first network node is restored to a normal-power operation, decoding the stored message.

17. The method of claim 13, wherein the received first message is a powerline communication (PLC) message.

18. The method of claim 13, wherein if the detected destination address is the first network node's destination address, the energizing the determined functional blocks further comprises energizing the main power supply, the main power supply capable of energizing all of the functional blocks of the first network node.

19. A method comprising:
receiving a first powerline communication (PLC) message from a network at a first network node;
partially decoding the first PLC message to detect a destination address for the first PLC message;
determining which functional blocks in the first network node to energize based on the detected destination address of the first PLC message, wherein if the detected destination address is the first network node's destination address, the determined functional blocks comprises a first set of the functional blocks of the first network node, wherein if the detected destination address is not the first network node's destination address, the determined functional blocks comprises a second set of the functional blocks of the first network node, the second set of the functional blocks being less than and included within the first set of the functional blocks;
energizing the determined functional blocks; and
responding to the first PLC message using the energized functional blocks.

20. The method of claim 19, wherein if the detected destination address is the first network node's destination address, the energizing the determined functional blocks further comprises energizing a main power supply, the main power supply capable of energizing all of the functional blocks of the first network node.

21. The method of claim 19, wherein the energizing the determined functional blocks further comprises energizing only receiver functional blocks.

22. The method of claim 19, wherein the responding to the first PLC message using the energized functional blocks further comprises transmitting a pre-stored PLC message over the network.

* * * * *